Nov. 7, 1944.  R. O. WILSON  2,362,180
APPARATUS FOR APPLYING TREAD RUBBER TO TIRES
Filed May 3, 1940  3 Sheets-Sheet 1

INVENTOR
Ray O. Wilson
BY
ATTORNEYS

Nov. 7, 1944. R. O. WILSON 2,362,180
APPARATUS FOR APPLYING TREAD RUBBER TO TIRES
Filed May 3, 1940 3 Sheets-Sheet 2

INVENTOR
Ray O. Wilson
BY
ATTORNEYS

Nov. 7, 1944.  R. O. WILSON  2,362,180
APPARATUS FOR APPLYING TREAD RUBBER TO TIRES
Filed May 3, 1940  3 Sheets-Sheet 3
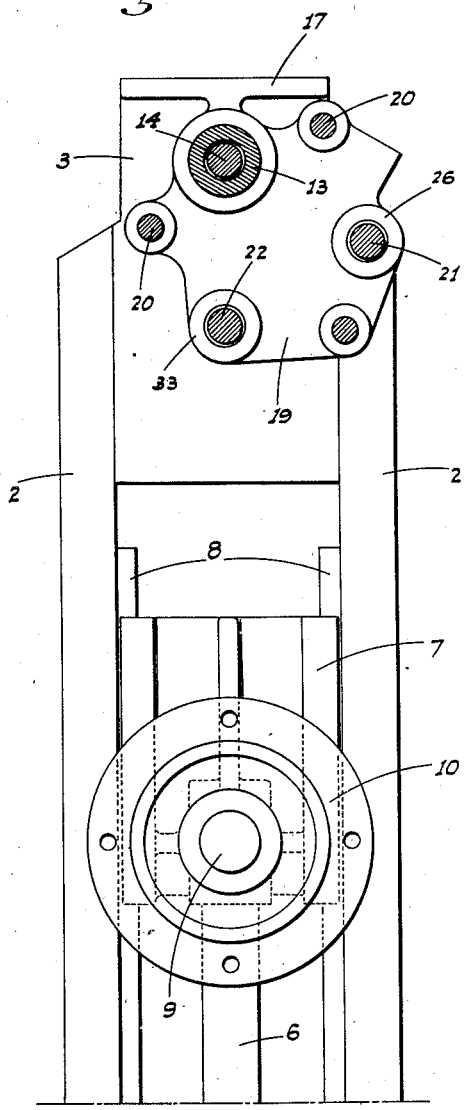
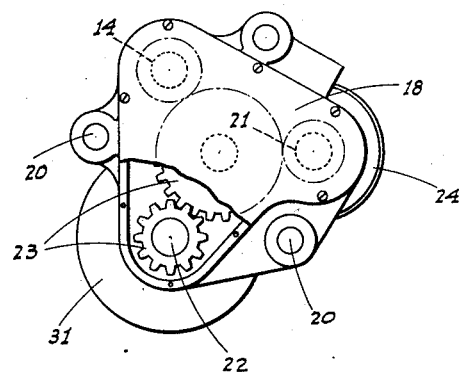
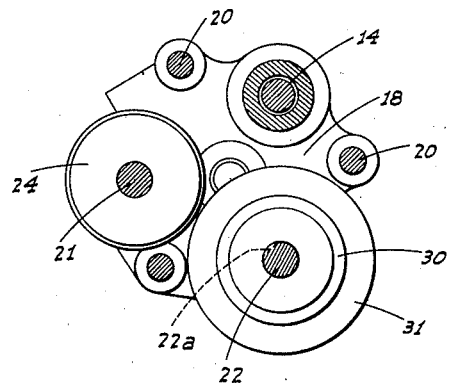
INVENTOR
Ray O. Wilson
BY
Webster & Webster
ATTORNEYS Patented Nov. 7, 1944

2,362,180

UNITED STATES PATENT OFFICE 2,362,180

APPARATUS FOR APPLYING TREAD RUBBER TO TIRES

Ray O. Wilson, Los Angeles, Calif., assignor of one-third to Arthur A. Behm and one-third to Leiland A. Irish, both of Los Angeles, Calif.

Application May 3, 1940, Serial No. 333,145

3 Claims. (Cl. 154—9)

This invention relates generally to the art of retreading or recapping tires, and is specifically directed to an apparatus for effectively bonding a strip of new unvulcanized or only partly vulcanized rubber to the tread portion of the carcass of a worn tire preparatory to vulcanizing a renewed tread thereon.

While of general application, my invention is of particular adaptability in bonding the tread rubber strip on the carcass of a tire wherein the strip is to be vulcanized by the so-called vapor cure process; i. e., where the tire is placed in an open kettle and subjected directly to the vulcanizing steam or vapor under pressure, as distinguished from the process known as the dry process, wherein the prepared tire is placed in a mold and the heat applied to the mold while the newly applied rubber is held under pressure within the mold. However, my apparatus may be used in connection with either method.

The primary object of the invention is to provide an apparatus whereby through the medium of a pressure external of the tire acting against a fluid pressure applied internally of the tire, the strip of rubber may be very securely bonded onto the tread of the tire so that when vulcanized, the newly applied tread will not loosen from the tire when the latter is put into service.

A further object of the invention is to provide a means of applying a constant and controlled pressure against the strip of rubber as it is being applied.

Another object is to provide means for first applying the pressure against the longitudinal median line of the strip and then progressively applying it to the whole surface of the strip to squeeze out all air between the strip and tire carcass.

A still further object is to provide additional means for applying independent pressure to the shoulder edges of the strip to insure proper adhesion between the strip and tire at the shoulder portions of the latter.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views;

Figure 3 is an enlarged fragmentary cross-section on line 3—3 of Figure 2, looking toward the stand.

Figure 4 is an outer end view of the gear housing and adjacent parts, the housing cover being partly broken away.

Figure 5 is an enlarged cross section on line 5—5 of Fig. 2, looking away from the stand.

Figure 1:
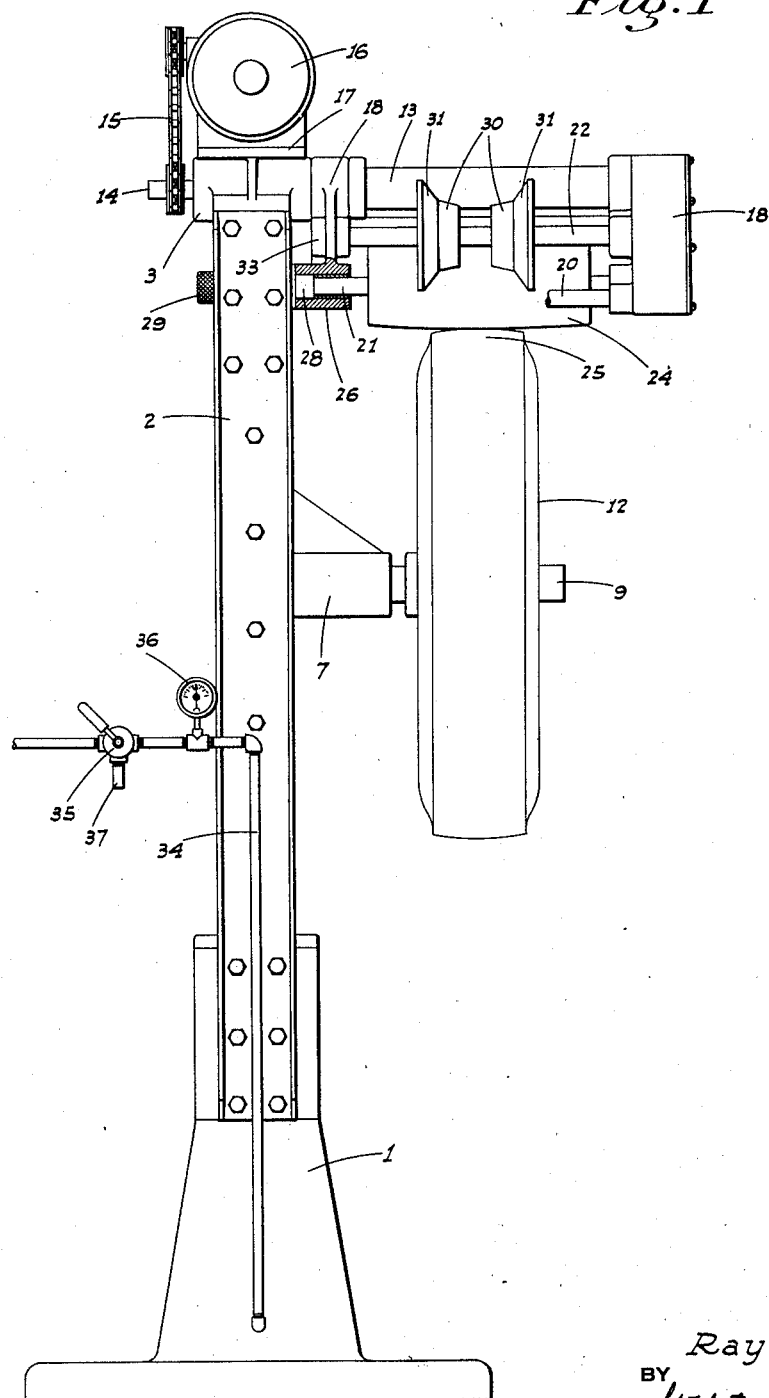
Figure 1 is a front elevation of the machine, showing the tread engaging roll in operation.

Referring now more particularly to the characters of reference on the drawings, the machine comprises a hollow base pedestal or stand 1, secured on and upstanding from opposite sides of which are uprights 2 which at their upper end support a head 3 disposed and secured therebetween.

Mounted in the pedestal is a vertical pressure cylinder 4 having a piston 5 from which a piston rod 6 projects upwardly between the uprights 2. The piston rod is secured on a cross head 7 slidably engaging vertical guide bars 8 mounted on the adjacent faces of the uprights. A horizonal fixed spindle 9 projects from one face of the crosshead, on which is turnably disposed a flanged member 10 corresponding to the flanged hub of a motor vehicle wheel. This member is adapted to be detachably connected to a wheel and rim unit shown conventionally at 11 on which the tire 12 to be treated is mounted.

Fixed in the head and projecting therefrom in overhanging and parallel relation to the spindle 9 is a sleeve 13. This sleeve turnably supports a drive shaft 14 which projects from the sleeve at both ends. At the head end of the sleeve, the shaft is connected by a chain drive 15 or the like to an electric motor 16 mounted on a base 17 formed on top of the head 3.

A gear housing 18 is turnably mounted on the outer end of the sleeve in depending relation, the shaft 14 projecting into said housing. A bracket 19 is also swung on and depends from the sleeve adjacent head 3, the housing and bracket being rigidly connected together as a unit by tie rods 20.

A pair of shafts 21 and 22 are journaled in and extend between the housing and bracket, said shafts being disposed in spaced relation in a common circular path centered at shaft 14. The shafts 14, 21 and 22 are all connected in driving relationship by a gear train 23 within housing 18.

A roller 24 is fixed on the shaft 21 between the housing and bracket, the roller having a convex curvature of relatively large radius from end to end as shown in Fig. 1. This roller, when disposed in direct radial alinement with and between the shaft 14 and spindle 9, is adapted to bear on the new tread rubber or camelback 25 of the tire.

The roller is releasably locked in this position by the following means: The roller shaft 21 terminates in a bearing boss 26 on bracket 19, said boss, when the roller is in said operative position, registering with a boss 27 formed on the head 3. A manually operable locking pin 28 is slidably mounted in boss 27 and is adapted to project into the adjacent end of boss 27, the shaft 21 terminating short of said end of the boss as shown in Fig. 1. The pin is of course operable from the side of the head opposite the bracket, and is provided with a knurled knob 29 so that it may be conveniently grasped and moved into or out of locking position.

Figure 6:
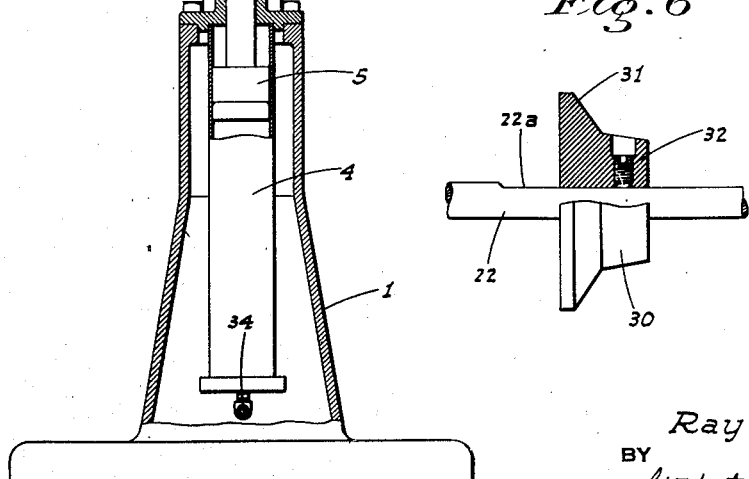
Figure 6 is an enlarged view, partly in section, of one of the edge engaging members and its mounting shaft.

The shaft 22 also projects between the housing and bracket, and is flattened along one face as shown at 22a. A pair of frusto-conical rollers 30, having beveled flanges 31 at one end are slidably mounted on the flattened shaft for adjustment along the same, being releasably held against movement from any adjusted position by countersunk set screws 32 as shown in Fig. 6.

Figure 2:
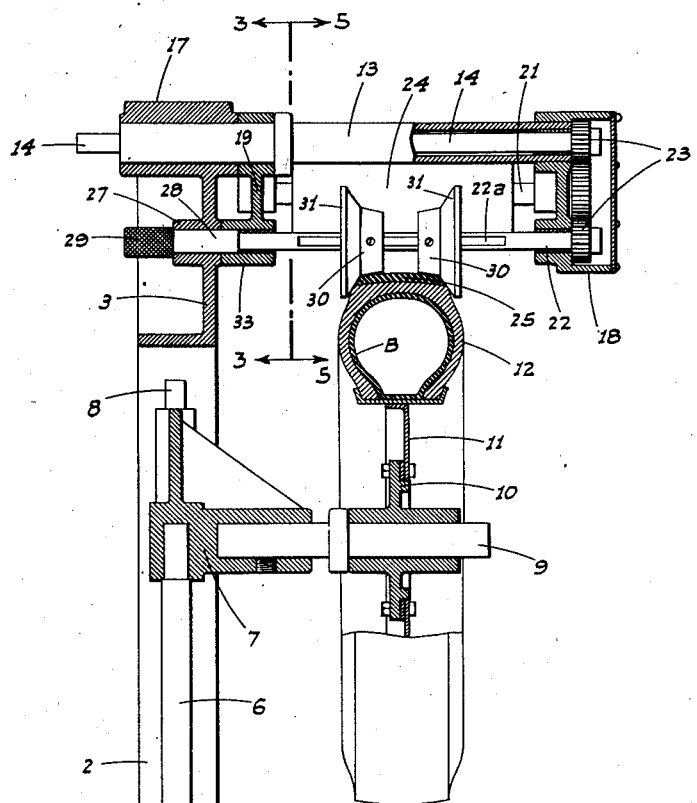
Figure 2 is a similar sectional view, showing the edge engaging elements in operation.

These cone rollers are disposed in oppositely facing relation to each other on the shaft and are adapted to engage the tire at the tread when the shaft 22 is in radial alinement with and between shaft 14 and spindle 9. The angle of portion 30 of the rollers conforms substantially to the slope of the tread on opposite sides, while the angle of the bevel of flanges 31 is such that they substantially conform to the slope of the side edges of the tread. The radial extent of the flanges is such that they project radially inward of the tire to a point beyond the junction of the new tread rubber with the sides of the tire, as plainly shown in Fig. 2. In this manner, when the edge rollers are adjusted toward each other the necessary distance determined by the width of the tire being treated, they will firmly press the tread rubber against the old rubber along the line of junction. The edge rollers are releasably held in operative position in the same manner as roller 24. In other words, shaft 22 terminates within and short of the end of a boss 33 on bracket 19, said boss being adapted to register with the locking pin boss 27 on head 3 to receive the locking pin.

It will of course be understood that since rollers 24 and 30 are constantly rotating, and when either one is engaged with the free turning tire, the latter will be rotated so that the tread is worked on for the full circumference of the tire.

The roller 24 engages the tread on its outer face, and due to the convex form of said roller, it will engage the tread at its center of width first, regardless of whether the tread has a transverse curvature or is flat. Any air bubbles or pockets which may have been left between the old rubber and the new when the latter is placed about the tire, are therefore pressed toward the side edges of the tire, where the air can escape.

In performing this operation, it is desirable that the tire shall be forced up against the roller with an adjustable pressure other than that provided by the air bag B within the tire. To this end, the pressure supply pipe 34 of the cylinder 4, which leads to the bottom of said cylinder, is provided with a three way control valve 35 positioned convenient to the operator standing alongside the machine; a pressure gauge 36 being connected to the pipe between the valve and cylinder. The three way valve of course controls the flow from the supply to the cylinder or from the cylinder to the exhaust 37, the piston lowering in the cylinder by gravity.

In operation, after the camelback is placed on the tire and the latter mounted on spindle 9, the roller 24 is disposed in operative position. The tire is then raised by admission of fluid to the cylinder until it engages the roller with the desired pressure, causing the tire to be rotated and the air to be expelled from between the camelback and the tire as previously explained.

When this operation is completed, the tire is lowered from the roller, and the edge engaging members 30, after being set the necessary distance apart, are turned to operative position. The tire is then again raised to contact said members and the tire again turns, causing the edges of the tread, at any points where they may have been lifted from the tire by the escape of air forced out by the action of roller 24, to be pressed into firm contact with the tire.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a tire-tread applying machine, means to rotatably support a tire, a drive shaft mounted in a fixed position parallel to the axis of a supported tire, a bracket swung for rotation about said shaft, a pair of driven shafts mounted on said bracket in spaced relation to each other and to the first named shaft and equidistant from the latter, means connecting all the shafts in driving relationship, a roller mounted on one of said driven shafts to engage the tread of a supported tire on its face when said roller is radially aligned with the tire, and elements mounted on the other driven shaft to engage the tread on its side edges when said elements are radially aligned with the tire.

2. In a tire-tread applying machine, a vertical stand including a hollow base and, transversely spaced uprights thereon, a driven roller supported from the top of the stand and overhanging the front thereof, a crosshead slidably mounted between the uprights, a spindle projecting from the crosshead parallel to and under the roller, a tire supporting rim on the spindle, a pressure cylinder disposed with a vertical axis between the uprights within and supported from the base and a piston rod projecting upwardly from the cylinder and connected to the crosshead.

3. In a tire-tread applying machine, means to rotatably support a tire, a drive shaft mounted in a fixed position parallel to the axis of a supported tire, a bracket swung for rotation about said shaft, a pair of driven shafts mounted on said bracket in spaced relation to the drive shaft and to each other and disposed in planes between said drive shaft and the supported tire, means connecting all the shafts in driving relationship, a roller mounted on one of said driven shafts to engage the tread of a supported tire on its face when the bracket is swung in one direction to a certain position, and elements on the other driven shaft to engage the tread on its side edges when the bracket is swung in the opposite direction to a certain position.

RAY O. WILSON.